E. W. BASCOM.
STABLE CLEANING MEANS.
APPLICATION FILED FEB. 14, 1918.
1,339,089. Patented May 4, 1920.
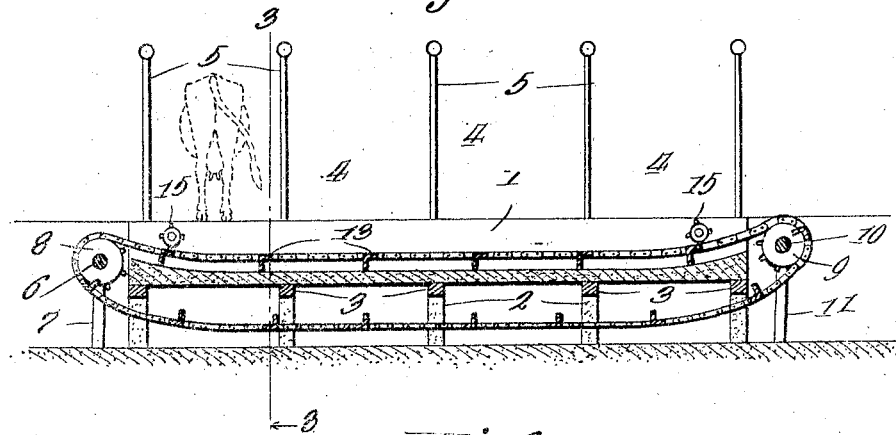
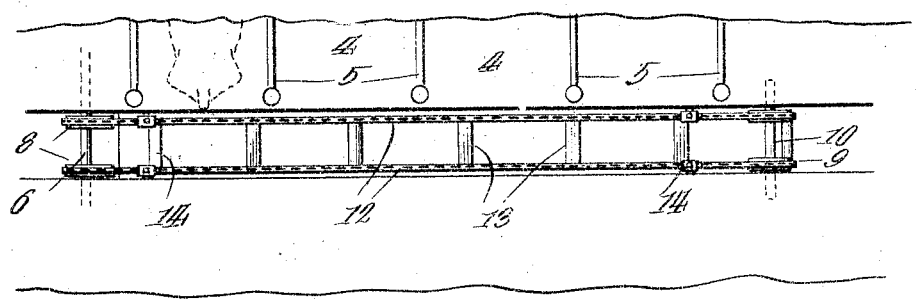
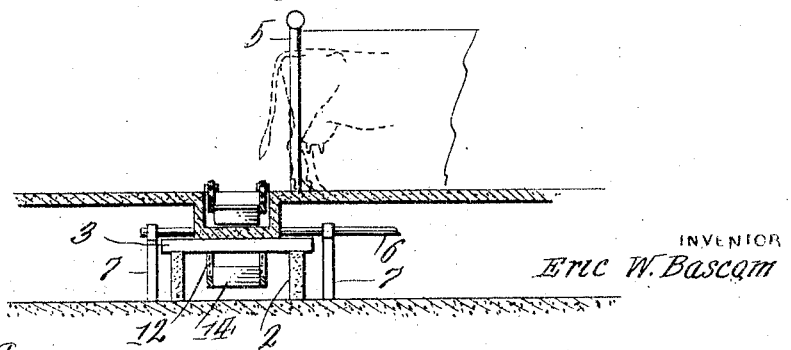
INVENTOR
Eric W. Bascom
WITNESSES
Guy M. Spring
H. H. Babcock.
BY Richard B. Owen.
ATTORNEY.

UNITED STATES PATENT OFFICE.

ERIC W. BASCOM, OF ALSTEAD, NEW HAMPSHIRE.

STABLE-CLEANING MEANS.

1,339,089.  Specification of Letters Patent.  Patented May 4, 1920.

Application filed February 14, 1918. Serial No. 217,114.

*To all whom it may concern:*

Be it known that I, ERIC W. BASCOM, a citizen of the United States, residing at Alstead, in the county of Cheshire and State of New Hampshire, have invented certain new and useful Improvements in Stable-Cleaning Means, of which the following is a specification.

This invention relates to stable cleaning means, and more particularly to means for cleaning cow stables.

One of the main objects of the invention is to produce simple and efficient means for mechanically cleaning a stable. A further object is to provide means whereby the materials to be removed may be readily discharged from the stable into a manure pit beneath the stable, or into a pile or heap from which the manure may be loaded and hauled as desired. Further objects will appear from the detailed description.

In the drawings:

Figure 1 is a side view of a cleaning apparatus constructed in accordance with my invention, as applied.

Fig. 2 is a top plan view.

Fig. 3 is a section taken substantially on line 3—3 of Fig. 1.

A concrete trough 1 is supported on uprights 2 and cross beams 3 parallel with, and closely adjacent the outer ends of the stalls 4 formed by the partitions 5. As will be noted more clearly from Fig. 1, the bottom of this trough is curved slightly upward adjacent each end this forming, in effect, an elongated trough-like depression well adapted to receive and retain the materials to be removed.

A shaft 6 is rotatably mounted adjacent one end of the trough in standards 7. Two sprocket wheels 8 are secured on this shaft in spaced relation and adjacent each side wall of the trough. The sprocket wheels 8 are in alinement with two sprocket wheels 9 secured on a shaft 10 which is rotatably supported adjacent the other end of the trough in standards 11. Sprocket chains are connected by rectangular or L-shaped scrapers 13. The shafts 6 and 10 are so positioned and the sprocket wheels 8 and 9 are of such diameters, that the upper run of the conveyer thus produced is operative in trough 1.

The scrapers 13 are secured with one arm disposed in the plane of the chains 12, the other arm being disposed vertically and directed inwardly of the conveyer. By rotating shaft 6 manually or in any other suitable manner, motion will be imparted to the conveyer. Preferably, though not necessarily, the shaft will be rotated in such direction as to cause movement of the upper run of the conveyer toward shaft 6. During the movement of the upper run of the conveyer, the vertical arms of the scrapers 13 will engage the material in the trough so as to scrape or drag this material to the end of the trough from which it is discharged into the pit, if the apparatus is used in connection with a pit, or into a pile from which it may be loaded and hauled. To insure complete removal of the material from the trough, I provide adjacent each end thereof the shaft 4. Two idler sprocket wheels 15 are secured on each shaft and these idlers engage the chains of the conveyer. The shafts 14 are positioned above the upper run of the conveyer and hold the scrapers in close engagement with the upper surface of the bottom of the trough.

In using this apparatus, the operating shaft 6 may be rotated manually or in any other suitable manner moving the scraper members 13 toward the end of the trough, the upper run of the conveyer traveling toward the shaft 6. As the plates are held in close contact with the upper surface of the bottom of the trough, these members serve to remove all material therefrom in the manner previously described. This apparatus is of simple construction and may be readily installed and provided with simple and efficient cleaning means.

It will be evident that there may be slight changes made in details in the construction of the various parts of my invention without departing from the field and scope of the same, and I intend to include all of the variations as fall within the scope of the appended claim, in this application in which a preferred form only of my invention is disclosed.

What I claim is:

In an apparatus of the character described, a trough comprising sides and a bottom, the upper surface of the bottom being curved upwardly adjacent each end and the highest point of the curved portion terminating below the tops of the sides, shafts rotatably supported a distance from each end of the trough and in alinement with the upper curved ends thereof, pairs of sprocket wheels secured on said shafts in spaced relation, chains passed over said sprocket wheels and having the upper run operating in the trough, inwardly directed spacing members secured to said chain and serving to connect the chain so as to form therewith an endless conveyer, said spacing members being adapted to engage the upper surface of the trough, shafts supported in the trough transversely thereof and adjacent the ends, and sprocket wheels rotatably mounted on the shaft and engaging the upper surface of the chains for pressing the spacing members into contact with the surface of the trough, said sprocket wheels holding the chains and spacing members therebetween in horizontal plane.

In testimony whereof I affix my signature in presence of two witnesses.

ERIC W. BASCOM.

Witnesses:
WM. CALKINS,
STANLEY LAWRENCE.